United States Patent [11] 3,526,175

[72] Inventors Hubertus Reimann
Dresden, Germany;
Siegfried Schütze, Dresden, Germany
[21] Appl. No. 634,756
[22] Filed April 28, 1967
[45] Patented Sept. 1, 1970
[73] Assignee VEB Pentacon
Dresden Kamera- und Kinowerke, Dresden, Germany

[54] PHOTOELECTRIC MEASURING DEVICES
4 Claims, 5 Drawing Figs.
[52] U.S. Cl. ................................................... 95/10,
324/96, 356/223
[51] Int. Cl. ............................................................. G01j 1/44
[50] Field of Search............................................ 95/10C,
64B; 352/141; 356/223; 338/89; 324/96, 98

[56] References Cited
UNITED STATES PATENTS
| | | | |
|---|---|---|---|
| 2,573,729 | 11/1951 | Rath............................ | 95/10(C)UX |
| 2,592,035 | 4/1952 | Jacoby......................... | 95/10(C)UX |
| 3,163,097 | 12/1964 | Zenyoji et al................. | 95/10(C)UX |
| 3,227,056 | 1/1966 | Lieser........................... | 95/10(C)UX |
| 3,266,395 | 8/1966 | Kremp et al.................. | 95/31UX |
| 3,397,629 | 8/1968 | Mori et al..................... | 95/10(C)UX |
| 2,680,177 | 6/1954 | Rosenthal..................... | 338/89 |
| 3,418,479 | 12/1968 | Schmitt........................ | 95/10(C)UX |

*Primary Examiner*—Norton Ansher
*Assistant Examiner*—Joseph F. Peters, Jr.
*Attorney*—Young and Thompson

ABSTRACT: A photo-electric measuring device having an arrangement for electrically introducing exposure factors such as diaphragm aperture, shutter speed, and film sensitivity. There is included at least two logarithmic potentiometers having constant internal resistance and a logarithmic variable voltage output connected in cascade with each potentiometer having a sliding contact operatively connected to a respective mechanical setting member. This arrangement is connected to a light sensitive element influenced by the prevailing light conditions and an indicating device influenced by the light sensitive element and the positions of the sliding contacts of the potentiometers. Under constant light conditions, adjustment of the mechanical setting members is made until a required indication occurs on the indicating device thereby adjusting the mechanical setting members to obtain factors required for accurate exposure.

Patented Sept. 1, 1970 3,526,175

INVENTORS
HUBERTUS REIMANN
SIEGFRIED SCHUTZE
By Young + Thompson
ATTYS.

PHOTOELECTRIC MEASURING DEVICES

BACKGROUND OF INVENTION

The invention relates to an arrangement for the electrical introduction of exposure factors, such as diaphragm aperture, time and film sensitivity, into photo-electric measuring devices.

Photographic cameras are known in which for the setting, controllable by means of a measuring mechanism, of the exposure factors there is used a bridge circuit which is balanced in the case of correct association of exposure time, diaphragm aperture and film sensitivity. The balancing takes place due to the fact that a specific resistance ratio, which is formed by the value of the photo-conductive cell influenced by the object luminous intensity, and a fixed resistance, is to be imitated by shifting of a tapping on a resistance body. The displacement of the tapping here takes place through a mechanical totalling gearing, into which all three exposure factors are introduced.

In the case of an apparatus for the introduction and indication of the correct combination of exposure factors by means of light signals, the available single regulating resistance is also to be actuated by means of a totalling gearing.

Furthermore, devices are known in which, for the purpose of introduction of the exposure factors, several regulating resistances connected in series into the circuit of a photo-electric cell are adjusted.

Devices are also known having a light-sensitive cell, of which the voltage emitted on exposure to light opposes a compensation voltage which is to be adjusted by means of potentiometers.

The disadvantage of the former devices consists in that the totalling gearing necessary for the mechanical control of the relative displacement between slider and resistance body is very expensive due to the introduction of diaphragm aperture, time and film sensitivity.

The devices which have become known hitherto for the purely electrical introduction of the three guide values are not practicable, since both the kinds of circuit disclosed and the production accuracy of the potentiometers used do not permit exact introduction of the guide values. Thus with the stated series connection of a plurality of regulating resistances in the circuit of the photo-electric cell, the amount of the variation of a regulating resistance necessary for the introduction of an exposure stage is dependent upon the position of the sliders of the other regulating resistances, so that no fixed association is possible between the setting members which determine the exposure factors. Different settings lying in the ordinary extent of exposure are not possible at all. Moreover, the sensitivity of the arrangement is not constant in the whole adjustment range.

The disadvantage of the mentioned compensation circuit consists in that the potentiometer connected in parallel with the battery must be of very low ohmic value, in order to achieve independence of the setting values of the other potentiometers in each case. The consequence is too high a loading of the battery. Moreover, it is not possible to obtain the stage extent needed for diaphragm aperture and time setting, since as a result of the selected series connection of the potentiometers for exposure time and diaphragm aperture and their parallel connection to the measurement branch, only a part of the total voltage in each case lies over each individual potentiometer, and thus the possibilities of variation are limited.

The purpose of the invention is the provision of a practically exploitable electrical introduction of all the guide values which determine the exposure.

The object of the invention consists in making the controllable electrical introduction of any one guide value independent of the position of the other guide value setting members in each case, and ensuring that to each stage interval there is to be allocated a shift of the setting member by a constant amount, in order for example to be able rationally to exploit the available linearisation of the diaphragm aperture graduation. At the same time the number of the introducable guide value stages should be large and the battery loading by the setting elements should be small.

SUMMARY OF INVENTION

According to the invention this problem is solved, using voltage dividers coupled with setting members, due to the fact that the voltage dividers are formed by at least two cascade-connected resistance-damping members with logarithmic damping course and constant internal resistance, of which the necessary displacement for the achievement of a jump from exposure stage to exposure stage is constant. For the case where as light-sensitive element there is used a photo-conductive cell, the characteristic of which deviates from the ideal conductance, the damping members possess a damping course which compensates this deviation.

The exposure factor combination corresponding to the position of the damping members in each case is indicatable by means of a measuring mechanism or by light signals. The electronic system necessary for the introduction of guide values is connectable to a battery through a measurement key.

By reason of the constant internal resistance of the damping members, a cascade connection of several electric setting members is possible for the first time without these influencing themselves in the measure of the shift necessary in each case. Thus an exact and simple input of all exposure factors is possible which can be executed with low expense. As a result of the great damping extent (up to 90 db) of the utilised setting members there is also the possibility of introducing a large number of guide value stages. Since according to the invention the damping course of the setting members is variable for example by re-milling of their coating or by offsetting of the slider path in relation to that originally provided, for example by eccentric arrangement of the rotation axis of the sliders, it is also possible to use photo-conductive cells the conductance of which deviates from the ideal conductance. With the light signal control system according to the invention, which necessitates lower space requirements in comparison with measuring mechanisms, a clearly comprehensible indication of the position of the damping members at which an under- or over-exposure or the correct exposure would result is possible down to minimum luminous intensities. The arrangement according to the invention can be used either in a separate exposure meter or in a camera. In the latter case one of the damping members can be provided with branch connections corresponding to the number of the film sensitivity stages to be introduced, which connections are connectable to the other damping members through a contact device controlled by the film or the film cartridge. One of the damping members can also be arranged in an objective with pre-selector diaphragm, suitable for brightness measurement. As one of the damping members is installable directly in the camera objective, the gearing necessary hitherto for introduction of the diaphragm aperture, in the case of brightness measurement, can be omitted.

BRIEF DESCRIPTION OF DRAWINGS

The invention is to be explained in greater detail hereinafter by reference to several examples of embodiment. In the accompanying drawings.

DESCRIPTION OF PREFERRED EMBODIMENTS

Figure 1:
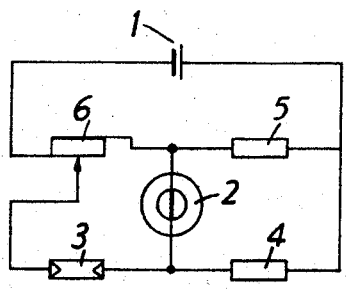
FIG. 1 shows bridge circuit with a damping member.

The principle of the effectiveness of a damping member used for the input of guide values according to the invention will be explained by reference to a bridge circuit which is illustrated in FIG. 1. However, the object of the invention is in no wise limited to such a circuit.

A voltage source 1 feeds a bridge, the balancing of which is indicated by a zero instrument 2. The lower branch of the bridge is formed by a photo-conductive cell 3 and a further resistance 4, which is equal for example to the maximum resistance value of the photo-conductive cell. In the upper bridge branch there lies a fixed resistance 5 having a resistance value which is equal to the constant internal resistance Z of a damping member 6 with logarithmic damping course, acting as voltage divider.

Assuming that the photo-conductive cell 3 receives the minimum illumination intensity and the damping member 6 is so set that the maximum possible voltage $\Delta U = U_B/2$ is tapped therefrom, the bridge obviously is in equilibrium. If, however, the illumination intensity on the photo-conductive cell 3 is increased by the factor $n$, then its resistance value drops to $1/n$ and the bridge is detuned. The renewed bridge balance is achieved due to the fact that, with invariable internal resistance of the damping member 6, the voltage $\Delta U$ tapped on the latter is reduced by shifting of its slider, namely similarly to $1/n$. As a result of the manner of operation of the damping member 6, where a constant angle rotation of the slider results in a variation of the voltage by a constant amount, it therefore ensues that to each exposure stage there can be allocated a constant displacement or rotation of the slider.

Figure 2:
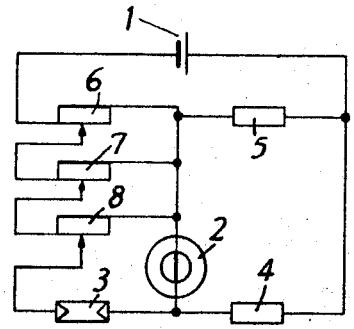
FIG. 2 shows arrangement for the electrical input of $x$, $t$ and $k$.

In FIG. 2 it is shown how the principle explained with reference to FIG. 1 can be utilised for the electrical input of all exposure factors. For this purpose it is only necessary to amplify the circuit arrangement by further damping members 7 and 8. With each of their sliders there is coupled one of the setting members on the camera for film sensitivity, exposure time and diaphragm aperture. When with the film sensitivity pre-set on the damping member 6 by tapping of a voltage $\Delta U$, the photo-conductive cell 3 is exposed to a specific scene brightness and thus the bridge is detuned, now the mentioned necessary voltage reduction is to be effected with the damping members 7 for the exposure time and 8 for the diaphragm aperture, until the bridge is balanced and thus the exposure factor combination necessary in each case is established. In this procedure, after the presetting of the film sensitivity, obviously the setting will firstly be effected of the member of which a specific value is required for the exposure. The measure of the necessary adjustment of each slider is not influenced by the position of the other, since the internal resistance of the damping members remains constant at every slider position. In this way a fixed association between the setting members which determine the exposure factors is possible. The use of several damping members, which is realisable according to the invention, at the same time opens up the possibility of arranging these at separate positions of the camera, and at the same time connecting them electrically with the other elements of the bridge. This advantage has an especially marked effect in the input of the diaphragm aperture, the adjustment of which, in cameras known hitherto with brightness measurement, is introduced into the camera through a space-consuming mechanical gearing and there transmitted to an adjusting resistance. In contrast thereto, according to the invention, one of the damping members can be installed directly in the objective.

Figure 3:
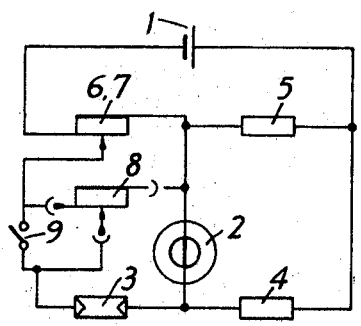
FIG. 3 shows arrangement for the input of guide values in light and dark measurement.

In FIG. 3 there is disclosed an example of a circuit arrangement according to which there can be used either objectives suitable for brightness measurement, with built-in damping member, or objectives of a conventional constructional style suitable for dark measurement. If an objective of the brightness-measurement type, that is an objective with pre-selector diaphragm, is used, the damping member allocated to the diaphragm setting remains the effective component of the upper bridge branch, since a switch 9 is opened. When an ordinary objective is used, the switch 9 is automatically closed on attachment of the objective to the camera, and thus the damping member 8 becomes ineffective. The input of the diaphragm aperture in this case takes place, with constantly variable brightness of the viewfinder image, through the photo-conductive cell 3 itself, which is more or less darkened by the diaphragm. Since the film sensitivity and the exposure time can be introduced with very simple means through a common setting member, the damping members 6 and 7 are combined into one single one, so that only two damping members are now necessary for the introduction of all guide values.

Figure 4:
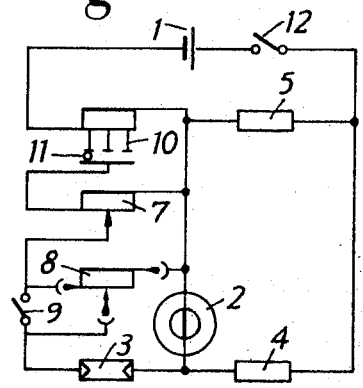
FIG. 4 shows arrangement for the automatic input of the film sensitivity.

According to FIG. 4, the damping member 6 is provided with branch connections 10, which are connectable through a contact device 11 controlled by the film or film cartridge to the other damping members 7 and 8, so that thus the automatic introduction of the film sensitivity is made possible. The loading of the battery 1 is kept low through a switch 12 formed as measurement key, which is closed only during the measurement operation.

Figure 5:
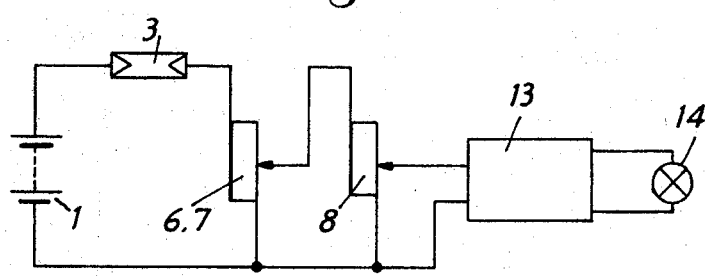
FIG. 5 shows an illustration of the principle of controllable input of the guide values by light signals.

As already emphasized at the outset, the object of the invention is not confined to a bridge circuit explained above merely as example of embodiment. Rather according to FIG. 5 the damping members can also form the input of a suitable switch stage 13, for example of a critically coupled trigger stage or of an oscillator, which, according to the position of the damping members, feeds a lamp 14 connected into its output, so that its light signals, in place of a measuring mechanism, indicate the nature of the guide value combination introduced into the camera at every position of the damping members, as regards over- and under-exposure and correct exposure.

We claim:

1. A photo-electric measuring device connected to a power source for introducing electrically photographic exposure factors such as diaphragm aperture, shutter speed and film sensitivity comprising a light sensitive resistance means adapted to vary in resistance in response to light from a subject to be photographed in circuit with said power source, variable electronic means for setting said exposure factors in circuit with said light sensitive resistance means and power source including a plurality of variable logarithmic potentiometer means, each having a constant input and output resistance with first and second terminals and a sliding contact therebetween to provide a variable logarithmic output voltage with variations in the position of said sliding contact, the resistance between said first terminal and sliding contact being substantially constant for all positions of said sliding contact, said logarithmic potentiometer means being cascade connected by said sliding contacts to be mutually independent, and an indicating means connected in circuit with said light sensitive resistance means and variable electronic means whereby adjustment of said sliding contacts and resistance variations of said light sensitive resistance means vary on indication by said indicating means.

2. The photo-electric measuring device of claim 1 wherein said light sensitive resistance means is a photo-conductive cell having a non linear characteristic, said variable electronic means providing a logarithmically varying output voltage to compensate for the non linearity of said photo-conductive cell.

3. The photo-electric measuring device of claim 2 wherein said light sensitive resistance means is included in a lower branch being connected across said power source, and said variable electronic means is included in an upper branch of said resistance bridge, said upper branch being connected across said power source, said indicating means being connected between said first and second branches.

4. The photo-electric measuring device of claim 1 wherein said variable logarithmic potentiometer means are connected in series with said light sensitive resistance means, and an electronic switching means is connected to the sliding contact of the logarithmic potentiometer means most remote from said light sensitive resistance means, said electronic switching means operating when a predetermined voltage is reached at the sliding contact of said remote logarithmic potentiometer means to activate said indicating device.